June 23, 1942.  E. R. MARCHOU  2,287,691
METHOD OF MAKING SELF-LOCKING NUTS
Filed Nov. 21, 1938   4 Sheets-Sheet 1
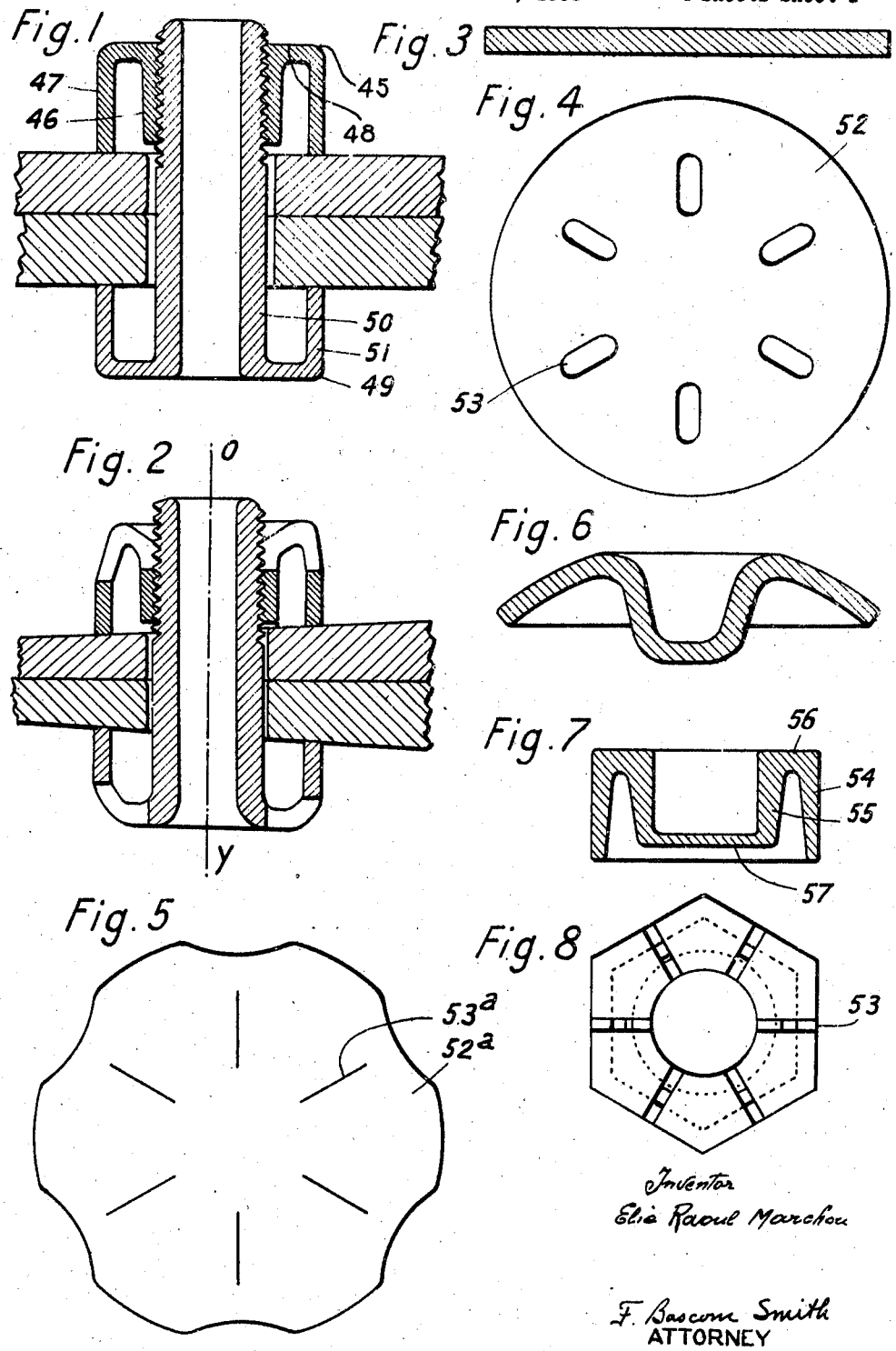
Inventor
Elie Raoul Marchou
F. Bascom Smith
ATTORNEY June 23, 1942. E. R. MARCHOU 2,287,691
METHOD OF MAKING SELF-LOCKING NUTS
Filed Nov. 21, 1938 4 Sheets-Sheet 2
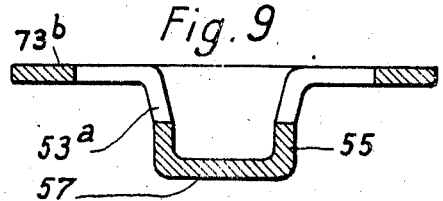
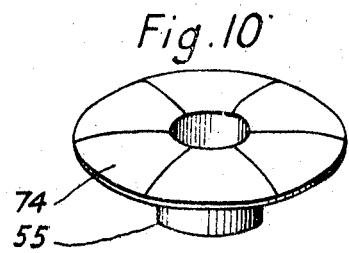
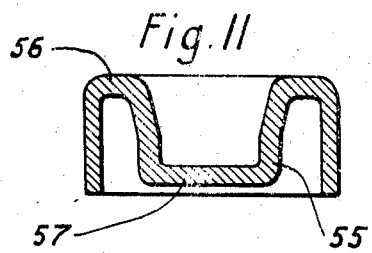
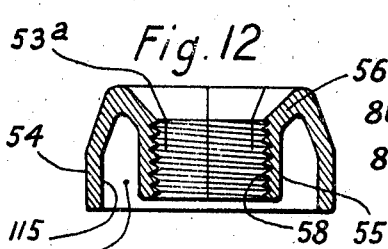
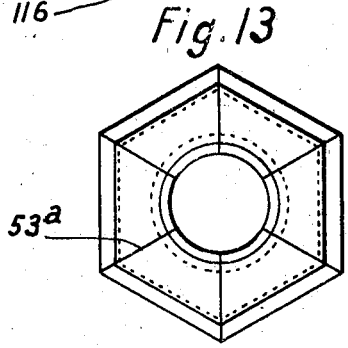
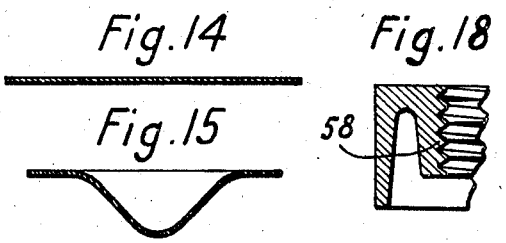
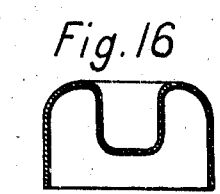
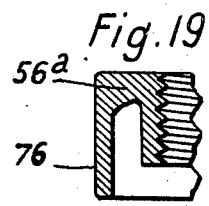
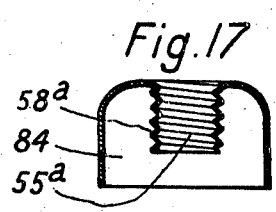
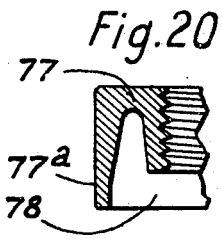
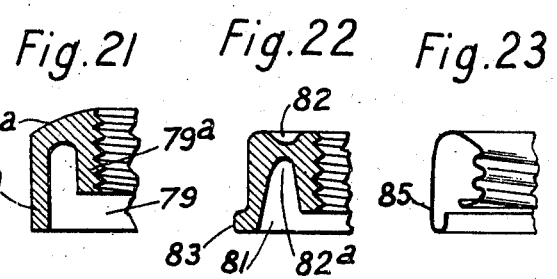
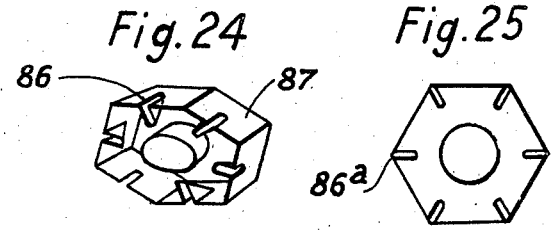
Inventor
Elie Raoul Marchou
F. Bascom Smith
ATTORNEY

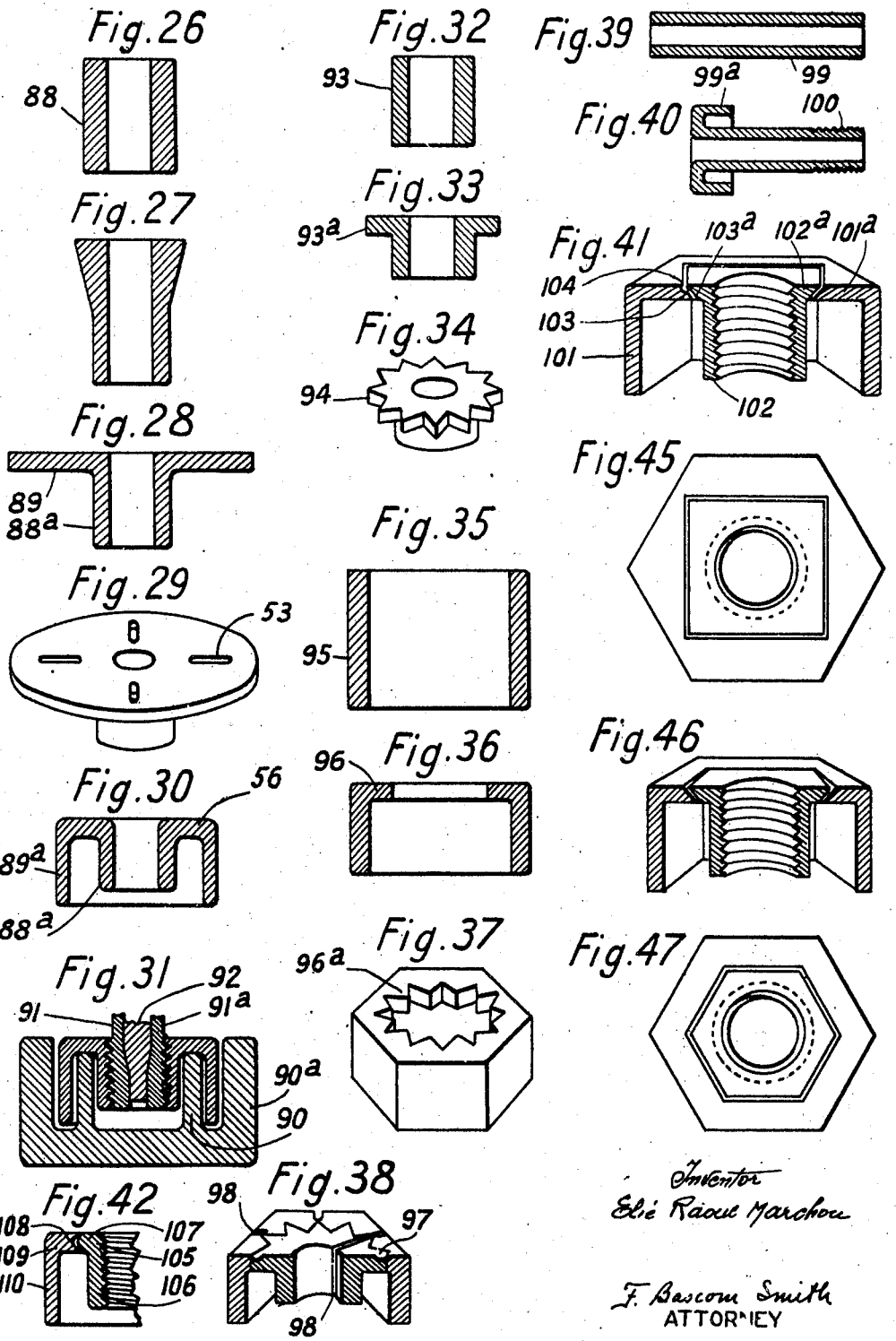

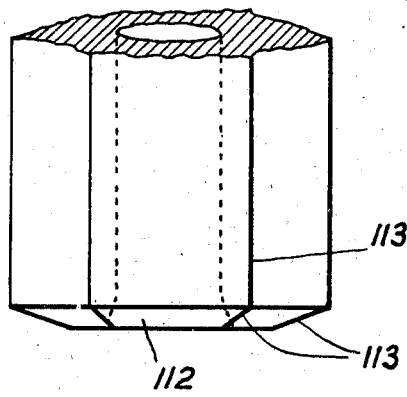
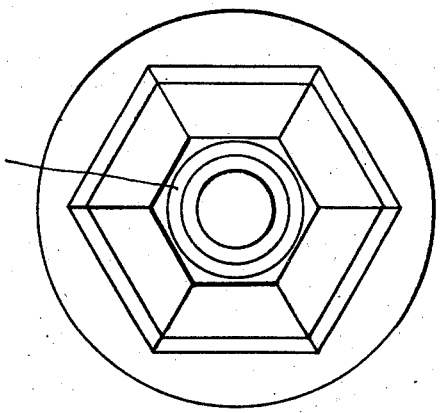
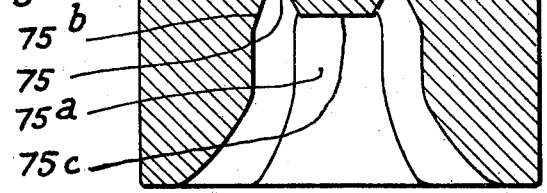

Patented June 23, 1942

2,287,691

UNITED STATES PATENT OFFICE 2,287,691

METHOD OF MAKING SELF-LOCKING NUTS

Elie Raoul Marchou, Neuilly-sur-Seine, France

Application November 21, 1938, Serial No. 241,575

2 Claims. (Cl. 10—86)

This invention relates to deformable self-locking nuts and more particularly to methods for producing the same by pressing or stamping sheet or tubular metal pieces.

One of the objects of this invention is to provide a novel method for producing deformable self-locking nuts whereby the elastic and resilient properties of the same are increased.

Another object of this invention is to provide a novel method for producing deformable self-locking nuts wherein the metal employed is strengthened by the working to which it is subjected.

Another object is to provide a novel method for producing deformable self-locking nuts, particularly of small size, wherein accidental deformations of the metal during manufacture are avoided.

A further object is to provide a novel deformable self-locking nut which is particularly adapted to be formed by pressing or stamping.

A still further object is to provide a novel deformable self-locking nut which may be formed from very thin sheet metal.

Another object is to provide a novel method for producing deformable self-locking nuts and light bolts having or not a deformable head, from tubular metal material.

Another object is to provide a novel method of the above character which comprises a minimum number of steps.

Another object is to provide a novel economical method for forming deformable self-locking nuts in large quantities.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

Fig. 1 is a longitudinal section of one embodiment of a completed deformable self-locking nut upon a bolt;

Fig. 2 is a section similar to Fig. 1, but showing two parts the exterior surfaces of which are not perpendicular with regard to axis O—Y and which are assembled by means of a novel deformable self-locking nut and a light tubular bolt having a deformable head;

Fig. 3 is a cross-sectional view of a sheet metal blank which is subjected to the novel method comprising the invention;

Fig. 4 is a top plan view of the element shown in Fig. 3 after undergoing an intermediate step of the novel method, which consists in making perforations by means of a punch;

Fig. 5 is a top plan view of the element shown in Fig. 3 after undergoing an intermediate step of the novel method, which consists in making incisions by means of a cutting tool operated by pressure;

Fig. 6 is a cross-sectional view of the sheet shown in Figs. 3 and 4 after undergoing a subsequent step of the novel method;

Fig. 7 is a cross-sectional view of a partially completed nut after undergoing other intermediate steps of this method;

Fig. 8 is a top plan view of the part shown in Fig. 7;

Fig. 9 is a sectional view of the sheet metal shown in Figs. 3 and 5 after undergoing other intermediate steps of this method;

Fig. 10 is a perspective view of the part shown in Fig. 9 after undergoing a further step of the novel method;

Fig. 11 and Fig. 12 are cross-sectional views of the part shown in Figs. 9 and 10, after undergoing other intermediate steps of the novel method;

Fig. 13 is a top plan view of the part shown in Fig. 12;

Fig. 14 is a cross-sectional view of another form of blank which is subjected to the novel method;

Fig. 15 is a sectional view of the element shown in Fig. 14 after being partially pressed into the desired shape;

Fig. 16 is a sectional view of a partially completed nut being the element shown in Fig. 15 after additional pressing;

Fig. 17 is a sectional view, with parts broken away, of one embodiment of a completed deformable self-locking nut;

Fig. 18 is a sectional view, with parts broken away, of a second form of a completed nut;

Fig. 19 is a sectional view, with parts broken away, of a third form of a completed nut;

Fig. 20 is a sectional view, with parts broken away, of a fourth form of a completed nut;

Fig. 21 is a sectional view, with parts broken away, of a fifth form of a completed nut;

Fig. 22 is a sectional view, with parts broken away, of a sixth form of a completed nut;

Fig. 23 is a sectional view, with parts broken away, showing one means for reinforcing the nut shown in Fig. 16;

Fig. 24 is a perspective view, with parts broken away, of another means for reinforcing the nut shown in Fig. 16;

Fig. 25 is a top plan view, with parts broken away, of still another means for reinforcing said nut;

Fig. 26 is a longitudinal sectional view of a tubular blank which is employed in a second method for fabricating a deformable self-locking nut;

Fig. 27 is a sectional view of the element shown in Fig. 26 after the first step in forming the nut;

Fig. 28 is a sectional view of the element shown in Fig. 27 after the ensuing step has been completed;

Fig. 29 is a perspective view of the part shown in Fig. 28 after a suitable punch has provided slots therein;

Fig. 30 is a cross-sectional view of the nut after undergoing a following step in the novel method;

Fig. 31 is a cross-sectional view of the part shown in Fig. 30 and, in addition, associated mandrels for impressing threads upon the nut;

Fig. 32 is a sectional view of a tubular blank employed in a third method of forming a deformable self-locking nut;

Fig. 33 is a sectional view of the element shown in Fig. 32 after undergoing an intermediate step of the third method;

Fig. 34 is a perspective view of the element shown in Fig. 33 after undergoing a subsequent intermediate step of said third method;

Fig. 35 is a sectional view of another tubular member which is employed in the third method;

Fig. 36 is a sectional view of the part shown in Fig. 35 after a subsequent step of the third method;

Fig. 37 is a perspective view of the element of Fig. 36 after a subsequent step of the third method;

Fig. 38 is a sectional view of a completed deformable self-locking nut made in accordance with the third method;

Fig. 39 is a longitudinal sectional view of a tubular blank from which a novel bolt is formed;

Fig. 40 is a longitudinal section of a completed bolt made in accordance with the novel method;

Fig. 41 is a perspective sectional view showing a second form of deformable self-locking nut made in accordance with the third method;

Fig. 42 is a sectional view, with parts broken away, of another form of deformable self-locking nut made in accordance with the third method;

Fig. 43 is a cross-sectional view of a matrix employed in the novel method;

Fig. 44 is an upright projection, with parts broken away, of a mandrel employed in the novel method;

Fig. 45 is a top plan view of the nut of which Fig. 41 is a sectional view;

Fig. 46 is a perspective sectional view of another deformable self-locking nut made in accordance with the third method;

Fig. 47 is a top plan view of the nut of which Fig. 46 is a sectional view; and

Fig. 48 is a top plan view of the matrix of which Fig. 43 is a sectional view.

The method comprising this invention relates to the fabrication of a deformable self-locking nut, the construction of which is set forth in the pending United States application Serial No. 187,065, filed on January 26, 1938. The device therein described comprises a nut which automatically locks itself when tightened and which is provided with a bearing face adapted for arranging itself to be parallel with the face of the portion to be clamped. The nut is constituted by an inner threaded cylindrical portion or barrel which is preferably shorter than a concentric outer skirt which is in the shape, for example, of the outer surface of a hexagonal nut, the skirt being connected to the barrel by a web which is located at the upper portion of the nut. The nut constantly exerts a pull on the bolt, since the barrel is always urged in this direction by the resiliency of the whole device. Suitable slots are provided in the nut to enable a resilient clamping of a bolt by the nut when the latter is tightened.

This invention, in addition to comprising a novel method for fabricating deformable self-locking nuts, includes a novel light bolt, having or not a deformable head, and a novel method for forming the said bolt, which is analogous to that of forming the nut.

Improvements in the construction of the nut are also provided which comprise novel web portions for interconnecting the barrel and skirt, the web portions being shaped to most favourably distribute the torque and shearing moments acting thereon.

One embodiment of this invention, including the successive stages of the shaping of a sheet metal blank undergoing the novel method, is shown in Figs. 1 to 13 inclusive. A flat sheet metal blank (Fig. 3) is here employed which may be of any desired metal or metal alloy.

Regardless of the type of metal employed, in order to prevent the blank from cracking during the shaping process and also to provide a finished product having a strength commensurate with the use to which it is to be put, heating, annealing, tempering or surface chemical treatments may, in certain cases, be employed before, after or during the course of the process. The heat or chemical treatments to which the metal may be subjected depend upon the ductility, malleability and toughness of the metal, and upon the tools used.

The sheet metal blank is first worked with a punch, which makes perforations as shown in Fig. 4, or with a cutting tool which makes incisions as shown in Fig. 5, such perforations or incisions being made between the center and the periphery and adapted to take the form of small slots of suitable width during the further steps of manufacture, the said slots being intended to permit an expansion or contraction of the finished product.

The blank, thereafter, is pressed into the above-described shape by suitable dies and mandrels (a few of which only are shown), in one or a plurality of consecutive steps.

In the form shown in Fig. 1, the deformable self-locking nut 45 formed by the novel method comprises a tapped or threaded inner member or barrel 46 having concentric therewith an outer skirt 47 of greater length than the barrel, the skirt being connected to the barrel by a web member 48 located at the upper portion of the nut, i. e. that portion opposite to the clamping face. The nut 45 engages a novel bolt 49 which is constituted by a tubular member 50 of light construction having suitable threads upon one extremity and a light head member 51.

As shown in Figs. 3, 4, 5, a blank is employed, from which the nut is fashioned, comprising, for example, a sheet metal disc 52 or 52a, having a thickness which after undergoing the subsequent pressing stages will be reduced to the desired size.

In order that the completed nut may be able to expand and contract in a yielding manner and to resiliently grip the bolt, suitable slots are provided. In the embodiment of the method here described, the slots are obtained by perforations or incisions made preferably at the beginning of the process when the metal is in flat sheet form. If the metal is ductile and malleable, no heat treatment is necessary to facilitate the shaping thereof or the punching of the perforations or pressing of the incisions; however, the blank may still require heat treatment to prevent failure of the metal while being worked. For example, disc 52 (or 52a) is first heated until a predetermined malleability is obtained, then perforations 53, or incisions 53a, are made therein by means of a punch or a cutting tool, respectively, which perforations or incisions are equidistant from the center and intermediate the center and periphery.

The disc 52, for instance, is then reheated and positioned over a suitable mandrel having a diameter less than that of the disc and having a hollow cylindrical center portion. The cross section of the mandrel is preferably in the shape of a polygon, for example a hexagon, upon which the outer faces of the nut are formed. Pressure is then applied, for example, by means of a suitable die; centrally of the disc and also at the peripheral margin thereof, whereby these two portions are forced in the same direction as shown in Fig. 6. An additional application of heat to insure proper malleability preferably precedes the following step wherein further pressure is applied to said central area and peripheral margin to press the skirt 54 and an inner barrel 55 into final shape as shown in Figs. 7 and 8, the skirt 54 being longer than the barrel.

In the form illustrated in said Figs. 7, 8, 11, 12, 13, a web 56 comprises the portion interconnecting the skirt and barrel, the web having the perforations 53, or incisions 53a, which here constitute the slots above mentioned for facilitating the resilient operation of the nut. The perforations 53, or incisions 53a, however, may be positioned in such a manner that when the nut is pressed into final shape the barrel is slit from top to bottom in one or a plurality of locations; also the perforations or incisions may form slots for the web and for only a portion of the barrel, or for the web and for only a portion of the skirt, or for only a portion of the web and for only a portion of the skirt, or the barrel, the slots extending along one or a plurality of radii.

An integral disc 57 remains across the lower extremity of barrel 55, after the last mentioned pressing operation, and must be removed preferably by a punch.

Suitable threads 58 (Figs. 12 and 18) are then cut in the inner surface of the barrel 55 by conventional means. Instead of cutting said threads by said means, as by a rotating cutter, the threads may be impressed in the metal in a manner to more fully appear later.

In shaping the nut as shown for instance in Figs. 7, 8, 11, it is possible, instead of employing a plurality of steps as above described, to heat the material to a predetermined temperature which depends upon the properties of the metal, and to stamp the nut into the shape shown in one operation.

In order that the shape of the nut may facilitate the removal of a mold or mandrel which extends into the nut between the barrel and the skirt, the width of the barrel and skirt, as shown in the novel embodiment of Fig. 18, progressively diminishes towards the lower extremity thereof. The internally extending mould may easily be extracted from the embodiment without undue stresses acting upon the nut.

In shaping the nut as shown in Figs. 9 to 13, it is preferable, chiefly for small size nuts, to use the means and tools described hereafter and illustrated in the drawings.

Fig. 9, for example, shows a section of a nut partially completed, the barrel 55 of which is cylindrical over part only of its height, the remainder having the shape of a reversed cone. This is necessary in order to arrive at a cylindrical shape of the barrel 55 over its entire height after submitting the nut, in a further operation, to radial compression over part of its height, as shown in Fig. 12.

In order to obtain the form shown in Figs. 9–13, the blank, for example disc 52a, after having been submitted if necessary to preliminary treatment, is placed over a matrix having a cylindrical or polygonal section and the diameter of which may be greater than that of said disc, which matrix has a hollow cylindrical central portion terminating in the shape of a reversed cone at the extremity on the substantially plane face of which is placed the disc. Pressure is then applied, for example, by means of a suitable mandrel, at the centre of the disc, so that the central area of the disc is pressed into the hollow cylindrical portion of the matrix, embracing the shape thereof.

The element shown in Fig. 9 is then shaped on a suitable mandrel, the diameter of which may be larger than that of the disc, and which has a hollow central portion corresponding in shape and size to the exterior perimeter of barrel 55 of the element shown in Fig. 9. The said mandrel has preferably a polygonal section and one of its extremities preferably in the shape of a pyramidal frustum, for example hexagonal (112) with projecting edges (113) as shown in Fig. 44. The element shown in Fig. 9 is placed on face 112 of the mandrel, the barrel 55 being confined in the hollow central portion of the said mandrel. Pressure is then applied, for example by means of a matrix (not shown) the shape of which corresponds to face 112, on the upper surface of the peripheral margin 73b, so that this latter is strongly pressed between the matrix and face 112 of the mandrel (Fig. 44). Thus the projecting edges 113 strongly impress themselves in the interior surface of the peripheral margin 73b which takes the form of the element shown in Fig. 10, in which the peripheral margin 74 is incurved towards the barrel and has on its interior surface profound impressions of the projecting edges 113 of the mandrel of Fig. 44, so that the subsequent operation is greatly facilitated, which operation consists in giving to the element its definite exterior form as shown in a sectional view in Fig. 12.

The element of Fig. 10 is then worked on a mandrel, one extremity of which is cylindrical and has a section smaller than that of the remainder thereof, which preferably is also cylindrical. The element of Fig. 10 is placed on the mandrel, the said extremity of which engages into the hollow cylindrical portion of barrel 55, from which disc 57 has been removed beforehand, in such a manner that the element of Fig. 10 is held against axial and lateral displacement. Pressure is then applied, first, on the perimeter of the peripheral margin 74, and then on the whole upper surface thereof, by means of a matrix of which Fig. 43 is a sectional view and Fig. 48 a top plan view, having a hollow central portion, preferably polygonal, for example hexagonal (75a), terminating in the shape of a pyramidal frustum 75b, while the bottom 75 of its hollow central portion is reversed in the shape of a conical frustum 75c, in such a manner that the peripheral margin 74 is strongly pressed into the bottom of the hollow cylindrical central portion 75a of the matrix and takes the form shown in Fig. 12. Fig. 12 shows that the said peripheral margin 74 now constitutes the web 56 and the skirt 54 of the nut, which in its definite shape presents an upper surface substantially concave and an exterior skirt 54 the perimeter of which is smaller at its upper portion than at its base. This form of nut is specially suitable.

In working as described, using mandrel shown in Fig. 44, matrix shown in Figs. 43 and 48, and the complementary elements described but not shown, the shaping of skirt 54, as said before, is greatly facilitated, as it gives to the skirt easily and correctly the form shown in Fig. 12. This is of the greatest interest in the manufacture of small size nuts, in which the hollow section 116 is too small to receive a shaped mandrel of sufficient strength to resist the pressure exercised by the interior surface 115 of skirt 54 when the latter is shaped definitely, which shaped mandrel can only be dispensed with in the way described.

The method described thus enables the manufacture of nuts having a very resistant and advantageous form which ensures utmost elasticity and resilience in clamping, which means increasing the quality of the product.

It is desirable that the cross-sectional shape of the web of the nut be chosen to most favourably distribute the shearing and bending moments which act thereon, the distribution depending upon the use to which the particular nut is to be put.

In the form shown in Fig. 19, a web 56a of a nut 76 is formed thicker near the skirt than near the barrel with the upper surface of the web substantially perpendicular to the barrel. The web in this embodiment will transfer from the barrel to the skirt a large proportion of the stresses acting in the former.

In the form shown in Fig. 20, a web 77 of a nut 78 is provided having a concave profile at the lower face thereof, the upper face being analogous to that of web 56a in Fig. 19. The thickness of a skirt 77a of this nut progressively increases towards the web 77, such changing thickness also influences the distribution of torques and bending moments acting upon the nut, the distribution being a function of the thickness of the barrel and the skirt.

In Fig. 21 there is shown a nut 79 having a barrel 79a and skirt 80, each of which is uniform in thickness. A web 80a is also of uniform thickness, but instead of being perpendicular to the barrel and skirt it is angularly disposed relative thereto in such a manner that in an untightened condition it comprises a frusto-conical portion having an upper periphery adjacent and integral with the barrel 79a.

Another form of web member is illustrated in Fig. 22 wherein the nut 81 is provided with a web having concave upper and lower surfaces 82, 82a, respectively.

The web is formed in the particular shapes here described by suitable mandrels or dies when the nut is being pressed or stamped into shape.

In order to increase the contact area of the lower face of the skirt, an annular bead 83 may be pressed therein which, in the form shown, extends outwardly (Fig. 22).

Instead of forming the deformable self-locking nut from a sheet metal blank, the thickness of which in the shaping process is reduced a predetermined amount, it is possible, when necessary to provide nuts of extremely light weight, to employ very thin sheet metal blanks (Fig. 14) which retain their original thickness while undergoing the novel method above described. The successive stages of the formation of a nut 84 from this thin material are shown in Figs. 14 to 17 and are analogous to those above set forth in connection with Figs. 3–8 with the exception that the thickness of the blank is changed by so minute an amount that the change may be disregarded. Suitable threads 58a (Fig. 17) should be pressed in the thin material of an inner barrel 55a of the nut rather than cut therein. A method and means for impressing these threads will be later set forth.

In order to reinforce the skirt and barrel of the light nut 84, suitable rollers may be employed, after the step of the method wherein the nut is pressed into the shape shown in Fig. 16, for rolling the lower edge of a skirt 85 thereof inwardly and upwardly. Thereafter, another roller may be employed for folding the lower edge of the barrel outwardly and upwardly (Fig. 23) such that the two rolled portions in flanged relation with their respective parts are adjacent one another but preferably not in contact.

Instead of employing the above rolled flanges as shown in Fig. 23, the light nut 84 may be reinforced by means of inwardly extending folds 86 which in the form shown in Fig. 24 are triangular in shape and perpendicular to the center of each face of the skirt 87. The upper vertex of the triangle is intermediate the upper and lower edges of the skirt with the base of the triangle on the same plane as the lower face of the skirt.

After the step of the method wherein the nut is pressed into the shape shown in Fig. 16, the step for forming folds 86 (Fig. 24) comprises placing the nut upon a suitable mandrel having indented portions corresponding to the shape of the folds. If the ductility and malleability of the metal permit, the folds are then "cold worked" into the faces of the skirt by means of fingers which engage the metal covering the indented portions; however, suitable heating may be necessary to prevent failure of the metal while being worked.

It is possible, instead of working folds into the central portions of each face of the skirt, to form them as at 86a at the intersection of the planes of said faces as shown in Fig. 25.

A second embodiment of the novel method is illustrated in Figs. 26 to 31 wherein a self-locking deformable nut is fashioned from a single tubular portion 88 instead of a sheet metal blank. The heat treatment of a tubular blank here employed is analogous to that of the first described method.

The blank 88 is placed over a suitable cylindrical core (not shown) or inner mandrel to prevent the subsequently acting thrusts from causing the blank to collapse inwardly. The core and blank are then placed, for example, within a jacket of suitable material which surrounds a portion of the length of the blank, preferably equal to the desired length of an inner barrel of the device. A press which, for example, is concentric with and slidably mounted upon the cylindrical core, and which is provided with a contact face perpendicular to the axis of the blank, then forces the unsurrounded upper portion of said blank into a flanged relation with the lower surrounded part, the latter now becoming an inner barrel 88a, the former a flange 89.

For the purpose above set forth, perforations 53 (Fig. 29) are next cut, for example by a punch, in the flange thus formed, or instead of perforations, incisions may be cut as shown in Fig. 5. The perforations or incisions are so disposed as to form slots in the finished nut, the slots extending radially to the intersection of the faces of a skirt member which is next formed, or extending perpendicular to said faces. As above set forth, the slots may extend from top to bottom of the barrel and to the web in one or a plurality of places, or to only a portion of the web and barrel, or to a portion of the web, barrel and skirt.

The jacket surrounding barrel 88a is now replaced by a hollow mandrel having a plurality of faces about which the skirt is to be formed, the said mandrel supporting a portion of the lower area of flange 89, thus holding the device from axial displacement in one direction. A suitable die or matrix is now employed for pressing downwardly the outer periphery of the above flange to form, for example, a hexagonal skirt 89a, which is longer than the barrel 88a and which extends in the same direction concentric therewith. The part of said flange which interconnects the barrel and skirt comprises a web 56.

Instead of punching slots 53 in the nut when the flange is first pressed into shape from the tube 88, the cutting of slots may be postponed until the nut is in the form shown in Fig. 30, at which time it is removed from the mandrels and the slots cut therein, for example by a rotating toothed cutter.

The following step of the second method comprises the formation of threads upon the inner surface of the barrel 88a. If the properties of the metal permit, suitable threads may be cold worked or pressed into the barrel, otherwise the metal must be heated to a predetermined point before the thread forming dies are applied. In the form shown in Fig. 31, the nut is placed upon a mandrel 90 which extends between the barrel 88a and the skirt 89a. A surrounding jacket 90a is then placed around the skirt 89a, and a threaded die 91 inserted within the barrel. The threaded die comprises, for example, a plurality of cylindrical segments 91a having the external cylindrical portions threaded and having a longitudinally displaceable conical wedge 92 centrally disposed therein, which, when forced downwardly, causes the segments to be thrust outwardly thereby impressing threads in the softer metal of the barrel.

Suitable tempering of the nut may then follow, as set forth in connection with the first method, whereby the desired hardness is imparted to the finished product in accordance with the use to which it is to be put.

A novel bolt especially adapted for use in connection with the novel nut may be fabricated from suitable light tubing, the bolt having a head formed in a manner identical to that employed in forming the skirt of the nut shown in Fig. 30, and also having threads preferably impressed upon one extremity thereof.

In the form shown in Fig. 39, a tubular blank 99 is employed for forming said bolt, the blank having a diameter, for example, equal to that of the bore of the barrel of the nut of Fig. 30. A suitable core is inserted within the bore of the tube and one extremity thereof is subjected to the same steps described in connection with Figs. 26 to 30, thereby forming a bolt head 99a. Threads 100 upon the opposite extremity of the bolt may be cut therein by a conventional rotating cutter or may be impressed thereupon. If the heat treatment of the bolt is necessary while undergoing the process, it is similar to that applied in connection with the previously described methods.

A third embodiment of the novel method is illustrated in Figs. 32 to 38, wherein the self-locking nut, instead of being fabricated from a single sheet or tube, is formed from two tubular members, each of which is pressed into such a shape that they may be joined together to form a unit.

An inner barrel for the nut here fabricated is formed from a tubular blank 93 which has, if necessary, undergone sufficient heating to render the same malleable and easily moldable and which, as in the second embodiment, has inserted therein a core (not shown) or a suitable mandrel for preventing the tube from collapsing inwardly when pressure is applied. The core and blank are then inserted within a suitable jacket which surrounds all but a small proportion of the full length of the tube. A press having a face preferably perpendicular to the axis of the tube is moved axially relative thereto to force the upper unsurrounded portion of the tube into a flange 93a (Fig. 33), the latter being small in diameter as it is intended to constitute only a portion of a web member.

In order that the periphery of the flange 93a may engage a cooperating portion of an inwardly extending flange of a skirt portion to later appear, locking or engaging means comprising, for example, teeth 94 are next formed upon said periphery by a suitable die. The flange 93a is heated, if required, to a predetermined temperature and the toothed die is brought to bear thereon whereby the teeth are stamped out or cut therein.

A skirt member for the present nut is fashioned from a tubular blank 95 which is of greater height and diameter than blank 93. In forming the skirt, the blank, if necessary, is heated to a proper temperature and inserted, for example, within a steel jacket for preventing outward expansion of the metal while a flange is being pressed thereon. The jacket surrounds the entire external surface of the blank. A core is then inserted in the bore of the blank which is adapted for supporting the entire interior surface thereof with the exception of a small strip from which the flange is to be formed. Means are provided comprising a suitable table for preventing axial movement of the blank in one direction upon which the assembled blank and mandrels are placed. An axially moving press having a diameter preferably equal to that of the blank is guided into the above-mentioned jacket, thereby pressing the metal inwardly to form the flange 96 (Fig. 36) in one or a plurality of thrusts.

A subsequent application of heat preferably precedes, if necessary, the stamping of teeth 96a (Fig. 37) in the inner periphery of flange 96 by means of a die analogous to that used in connection with Fig. 34.

The inner barrel formed from blank 93 is inserted within the skirt formed from the blank 95. Teeth 94 are slipped into mesh with teeth 96a. The skirt is inserted within a jacket for preventing outward radial expansion of the metal and a core is inserted within the inner barrel to prevent the metal from radially inwardly expanding. A suitable mandrel or arbor is then inserted between the inner barrel and the skirt with an upper face of the mandrel supporting the flanges 93a, 96 and therefore the engaged teeth 94, 96a.

In order to insure a permanent locking of the teeth in such a manner that the barrel and the skirt will become rigidly connected, an annular press having preferably a convex contact face is moved, co-axially with the nut mounted as above described, and brought to bear upon the side portions of the engaged teeth 94, 96a whereby a concave impression 97 is made therein, thus forcing the teeth into a permanent interlocking engagement.

Instead of employing teeth 94, 96a to obtain an engagement between said flanges, it is possible to use any suitable interlocking contour which may be pressed into permanent engagement by means, for example, analogous to those described above.

The skirt of the nut in its present form is circular instead of, for example, hexagonal, in cross section. In order that suitable faces may be formed in said skirt to facilitate tightening of the nut, a mandrel having the desired number of faces is inserted between the barrel and the skirt, the above mentioned core is retained within the barrel, and a mandrel face is positioned in contact with the upper face of the web to prevent axial movement or metallic expansion in that direction. A suitable press is then forced against the skirt, causing same to conform to the shape of the inner multi-faced mandrel whereby the faces of the nut are formed.

Slots 98 may be cut in the completed nut, for example by a rotatable toothed cutter.

A second form of a deformable self-locking nut fabricated in accordance with the third method is shown in Fig. 41 wherein a skirt member 101 supports an inner barrel member 102, said members engaging one another in a novel manner by means of cooperating web portions 101a and 102a.

The method for forming this embodiment of the nut, for example, is similar to that described in connection with the nut shown in Fig. 38, with the exception that the web members, instead of being joined to one another by interlocking the teeth which are cut upon the peripheries thereof, are joined by pressing together inclined shoulders which may be stamped in said peripheries.

In the form illustrated in Fig. 41, the inwardly extending flange 101a is stamped, preferably in the above-mentioned manner, the flange being at first annular in shape. In order to prevent relative angular movement of the barrel and the skirt, the flange, for example, is placed upon a mandrel and pressed by a suitable die to form a square central aperture as shown in a top plan view in Fig. 45. Instead of a square aperture, any other contour of straight or curved lines may be employed, for instance the central aperture may be hexagonal, as shown in a sectional view in Fig. 46 and in a top plan view in Fig. 47. The periphery of this flange is then preferably stamped into an inclined shoulder 103 with the upper edges of the periphery being at a greater distance from the center of the aperture than the lower edge of said periphery. The forming of the desired aperture and the shaping of said shoulders may be performed in one operation.

The barrel member 102 with flange 102a is then formed in a manner analogous to that above described in connection with the barrel of Fig. 33. However, the outwardly extending flange 102a is pressed by a suitable die into a shape which will cooperate with flange 101a to form a complete web for the nut. Therefore, a suitable die is thrust against flange 102a to press the same into a square. The periphery in the same or in a separate operation may be pressed into an inclined shoulder 103a which is adapted for cooperating with shoulder 103 in such a manner that a downwardly acting force upon barrel 102 will be firmly communicated to web 101a and hence to skirt 101.

In order to secure a rigid engagement of shoulders 103, 103a, a mandrel may be placed, for example, between the barrel and the skirt member to support the lower surface of flanges 101a, 102a, thereby preventing axial motion downwardly as viewed in Fig. 41. A convexly faced press having a shape which conforms to the cooperating upper edges of the shoulders is then brought to bear thereon to press the edges into interlocking engagement as at 104. Any other suitable means may be employed for pressing the shoulders 103, 103a into a firm engagement.

The embodiment shown in Fig. 42 is identical in construction and method of fabrication to the nut shown in Fig. 41 with the exception of the construction and method of forming the interlocking peripheries of the flanges of a barrel and skirt member. In this form, for example, the outer periphery of a flange 105 of a barrel 106 is provided with an annular bead 107 which may have a convex or any suitable surface for engaging and cooperating with a concave periphery 108 of an inwardly extending flange 109 of a skirt 110.

In forming this nut, the skirt and barrel may be pressed into shape forming the flanges 105, 109, the flanges being at first without the interlocking peripheral contours. The method of formation of these parts is similar to that employed, for example, in connection with the above described embodiment shown in Fig. 38. The concave portion 108 may then be removed by a suitable cutter, or a die having the desired peripheral cross section may be held against the inner periphery of the flange and the edges thereof bent thereover. The barrel may then be inserted within the skirt with the peripheries of the flanges thereof adjacent to one another. Suitable mandrels may then be placed beneath the flanges and a press brought to bear thereupon whereby the metal of the inner flange is forced into said concave portion 108 thereby effecting a rigid interlocking engagement between the skirt and barrel.

In order to provide an extremely light novel nut of the above character, the outer skirt member 101 may be formed from some light metal, for example, duralumin; the barrel member 102, however, is preferably of harder material such as steel, which is obviously necessary and desirable where threads must communicate a thrust to the remainder of the device. This particular combination of dissimilar metals or materials in the construction of the nut of the above character aids not only in reducing the weight of the nut but also in reducing the cost of manufacture.

There is thus provided a novel deformable self-locking nut and a bolt, together with novel methods for fabricating the nut and bolt. The methods herein described are adapted for producing the nut and bolt in vast quantities at extremely low cost and to provide a finished product which is superior in efficiency, strength and durability. The novel methods furthermore are capable of providing deformable self-locking nuts for many varieties of uses. No highly expensive machinery is required, nor are any highly complicated dies necessary to carry out the above methods.

Although three embodiments only of the novel method have been described in detail, it is to be expressly understood that the same is not to be limited thereto. For example, certain forms included in the first embodiment are obtained with thermic treatment preceding each pressing operation; this may be dispensed with if the properties of the cold metal permit, viz. ductility, malleability, elasticity, etc. . . . Also, a plurality of steps have been shown for producing the forms included in the first embodiment; however, same may be obtained in a single step, for example, if the size of the nuts permits, or if the metal blank which is used in the process either has been heated to a sufficient temperature to be worked, or has sufficient malleability to be cold pressed in a single step without intermediate annealing. Instead of employing metal in the fabrication of the above nut, it is possible to use a plastic or an analogous condensation product, the plastic being of sufficient strength to withstand the stresses acting thereupon. Various changes may also be made in the design and operation of the completed nut and in the embodiments of the methods here described without departing from the spirit and scope of the invention as the same will now be understood by those skilled in the art. For definition of the limits of the invention, reference will be had primarily to the appended claims.

What I claim is:

1. The method of forming a deformable self-locking nut from a tubular blank which includes holding the inner surface of said blank against radial expansion inwardly, holding a predetermined part of the external surface of said blank against radial expansion outwardly, holding said blank against axial movement in one direction, pressing into a flange the part of said blank which is free to radially expand outwardly, providing a plurality of radial slots intermediate the edges of said flange, holding a portion of said flange from movement axially of said blank, and applying pressure to said flange thereby shaping a portion of the same into a skirt.

2. The method of forming a deformable self-locking nut from a tubular blank which includes holding the inner surface of said blank against radial expansion inwardly, holding a predetermined part of the external surface of said blank against radial expansion outwardly, holding said blank against axial movement in one direction, pressing into a flange the part of said blank which is free to radially expand outwardly, providing a plurality of radial slots intermediate the edges of said flange, holding a portion of said flange from movement axially of said blank, applying pressure to said flange thereby shaping a portion of the same into a skirt, and stamping threads on the innermost wall of the cylindrical portion of said blank.

ELIE RAOUL MARCHOU.